United States Patent [19]

Neddo et al.

[11] 4,006,558
[45] Feb. 8, 1977

[54] SEEDLING PLANT PROPAGATION CONTAINER

[75] Inventors: Keith S. Neddo; G. Michael Alder, both of Holiday; James L. Gwilliam, Jr., Salt Lake City, all of Utah

[73] Assignee: Native Plants, Inc., Salt Lake City, Utah

[22] Filed: Sept. 11, 1975

[21] Appl. No.: 612,370

[52] U.S. Cl. .................................... 47/77; 47/86; 206/423

[51] Int. Cl.² .......................................... A01G 9/02

[58] Field of Search ............. 47/34, 34.13, 37, 38, 47/38.1; 220/23.4, 21; 206/423; 229/2.5 R, 28 R

[56] References Cited

UNITED STATES PATENTS

| 265,097 | 9/1882 | Johnston | 47/38.1 X |
|---|---|---|---|
| 2,865,137 | 12/1958 | Longacre | 47/38.1 |
| 3,557,489 | 1/1971 | Ferrand | 47/34.13 X |
| 3,647,105 | 3/1972 | Keeslar | 220/23.4 |
| 3,678,620 | 7/1972 | Voges | 47/37 |
| 3,722,137 | 3/1973 | Kesinger | 47/34.13 |
| 3,889,416 | 6/1975 | Bergeron et al. | 47/34.13 |

FOREIGN PATENTS OR APPLICATIONS 358,272  11/1961  Switzerland ........................ 47/34

Primary Examiner—Edgar S. Burr
Assistant Examiner—James R. Feyrer
Attorney, Agent, or Firm—Criddle, Thorpe & Western

[57] ABSTRACT

A two-piece tubular apparatus which when the two pieces are frictionally engaged forms a multiple cavity device for the planting and propagation of seedlings such as shrubs, trees, and the like. Each cavity is corrugated around the entire outer perimeter thereof. The lower portion of each cavity slopes inwardly terminating in an opening sufficient to allow for drainage but which is considerably smaller than the top opening. The device is freestanding and has an outwardly extending tab section near the top thereof so that said apparatus or device can rest in a container without the bottom of said device touching the floor of said container.

7 Claims, 4 Drawing Figures

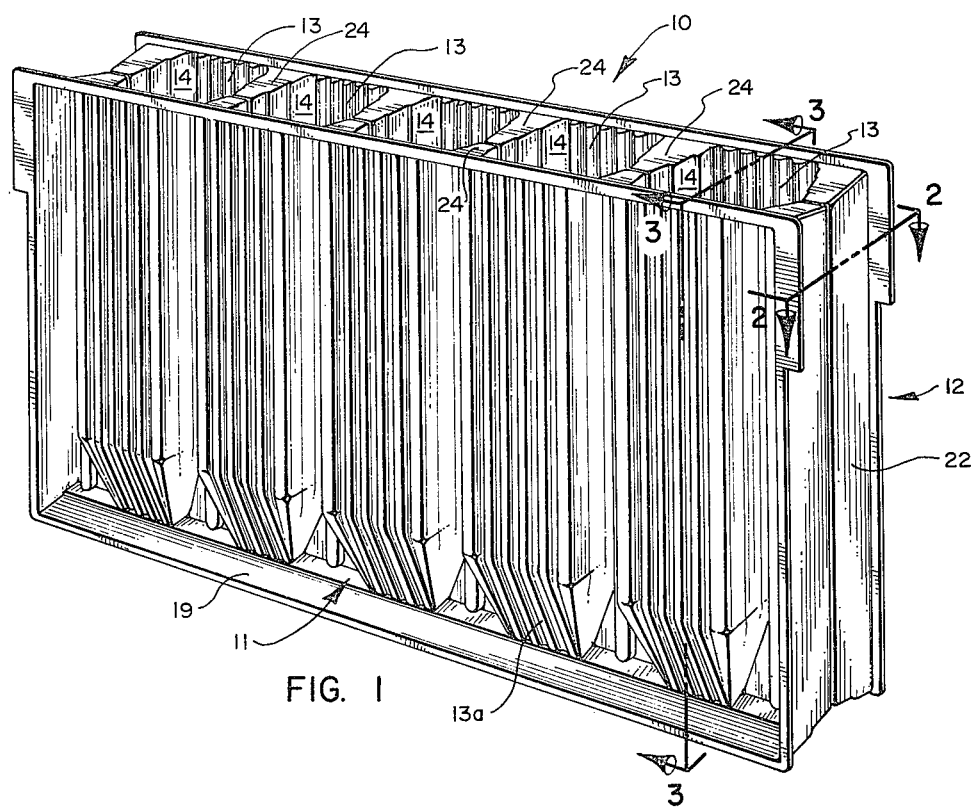
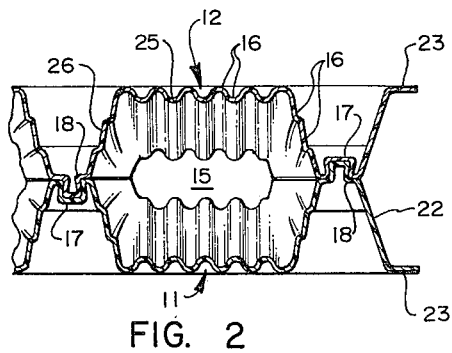
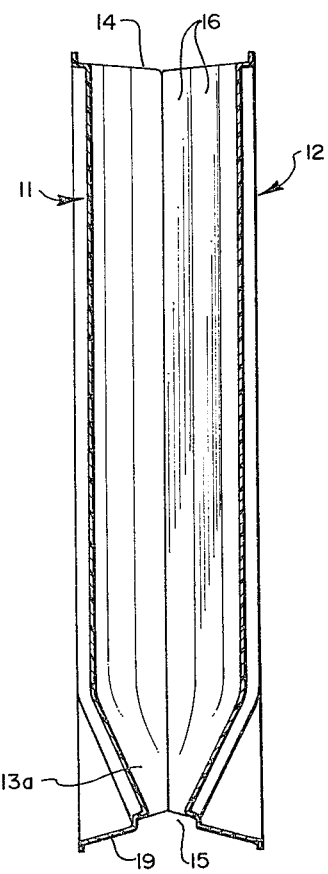
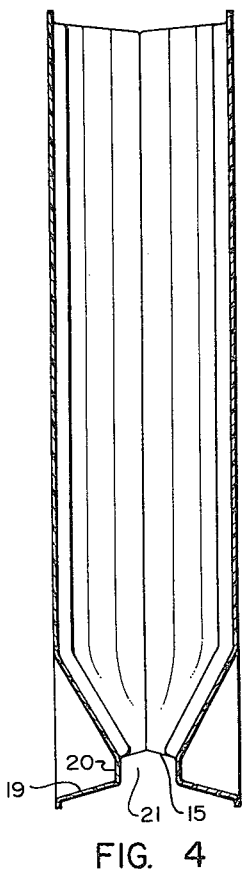
FIG. 1
FIG. 2
FIG. 3
FIG. 4

SEEDLING PLANT PROPAGATION CONTAINER

BACKGROUND OF THE INVENTION

This invention relates to a multiple tubular plant propagation apparatus. More particularly, this invention relates to a two-piece, snap together plant propagation apparatus capable of sprouting and holding growing seedlings until time for transplantation into a more permanent habitat.

Various containerized systems for individually growing seedlings have been devised. Typical of such devices are U.S. Pat. Nos. 3,447,261; 3,722,137; 3,788,002; and 3,872,621. Each of these patents provides the means whereby seedlings may be planted, nurtured and transported prior to transplantation. A heretofore common problem with substantially all containerized planting means is that such means often produce seedlings with deformed root structures due to the tendency of the roots to grow in a spiral. Moreover, when sprouting seedlings have a taproot, the taproot may be the only root developed. Often the taproot grows too long and must be pruned when transplanting thereby providing a shock to the plant. On the other hand, the container may be of insufficient depth for the taproot to develop sufficiently.

An additional problem commonly encountered with various containerized planting containers is the crossover of roots from one containerized section into another thereby damaging the root system of the plant when the roots from adjoining compartments have to be separated or broken.

A tubular planting device which overcomes many of the prior art problems is marketed by Spencer-Lemaire Industries Limited in Canada under the trade name "Rootrainers". These devices are thermoformed sheet plastic folding pots which are held together in a box designed to be used with said pots. When folded like a book, multiple cavities are formed which can be filled with a growing medium, seeded and function as containers for the seedlings. Each container includes grooves on the outer sides which are designed to prevent roots from spiraling and are frictionally joined together by a shiplap seal which purportedly prevents roots from wandering from cavity to cavity. Each cavity contains a hole in the bottom thereof for drainage purposes, but the device is not freestanding and necessitates being placed in a special container. When placed in a special container so that the bottom hole of each cavity is above the surface, these devices have many of the same advantages contained in the present invention. However, a special holder is required in each instance. It has also been found that when the prior art devices are filled with soil or other media, the shiplap seal has a tendency to break apart, and in certain instances, root crossover from one cavity to another has been observed.

OBJECTS OF THE INVENTION

It is an object of the present invention to provide a planter having multiple cavities, which cavities are made by fitting together two pieces of material which are interlocked.

It is a further object of this invention to provide a multiple cavity planter being opened at both ends which is freestanding wherein the lower opening is above the surface upon which the planter is standing.

It is a still further object of this invention to provide a planter which will fit together in such a manner that it will stay shut when filled with soil or other growing means, and which will prevent root crossover from one cavity to an adjoining cavity.

Another object of this invention is to provide a planter having multiple cavities wherein each side of each cavity is corrugated to direct the growth of the roots downwardly and prevent root spiraling.

An additional object of this invention is to provide a two-piece planter having multiple cavities wherein the pieces may be pulled apart at any time for root inspection and then put back together without damaging the germinating plant.

A still further object of this invention is to provide a multiple cavity planter having outwardly extending tabs in the end portions thereof which suspend the planter and allow for convenient stocking or spacing of the planters as well as "air pruning" of taproots as they emerge from the end of the cavity.

These and other objects may be accomplished by means of a freestanding multiple cavity planter device consisting of two sidepieces which are frictionally held together by interlocking means which are contained on either side of each cavity. Such interlocking means prevent the cavities from popping open due to the pressure of the planting media contained therein. Each cavity contains vertically spaced corrugations which extend around the entire perimeter of a cavity and the cavities taper in at the lower portion terminating with an open portion which is substantially smaller than the open top of the cavity.

The planting device is freestanding due to a platform which extends outwardly and slightly downwardly at an angle from the open cavity bottoms. This provides a base wherein the cavity bottom is above the base thereby allowing the taproot of a plant growing within the container to extend through the opening in the bottom of the cavity and thereby be "air pruned". When the taproot is exposed to the air that portion of the root will cease to grow which sends a signal to the taproot to send out branches, thereby strengthening the root structure of the plant within the cavity. The corrugations on each side of the cavities prevent the roots from spiraling and thereby encourage the downward growth of the roots, again strengthening the root structure and improving the health of the plant.

An additional feature of the planting device is that the interlocking means on either side of the cavity extend vertically, substantially the same length as the cavity and consists of oppositely facing grooves and ribs of the same dimension, the ribs frictionally fitting into the grooves. If desired, one sidepiece may contain grooves and the other sidepiece, ribs; however, it has been found more practical to have alternating ribs and grooves in each sidepiece, especially when the container contains an odd number of cavities. In this manner, only one die is necessary to stamp out the sidepieces of thermoformed plastic material. The sidepieces are then identical, but when turned to face each other each sidepiece will contain a groove and rib which may be frictionally interlocked together.

The ends of the planter container extend backwardly from the outside interlocking means at each end and are continguous with the outwardly extending platform or base at the bottom thereby forming a continuous rim or flange around the bottom and sides of each sidepiece. This rim or flange is in the same plane as the outer sides or portions of each cavity.

An additional feature of the invention consists in providing outwardly extending tabs which are substantially at right angles with the backwardly extending end portions near the upper part of said end portion. These tabs thereby provide a flange which may suspend the planting device, when assembled, between two supports such as rods or the side of a box thereby providing a means whereby the planting devices can be stacked and suspended in a container. This not only facilitates the storing of the containers in a side by side relationship, but also promotes "air pruning" of the taproots that emerge through the bottom opening of the cavity.

The novel features of this invention, both as to the manner of construction or organization, will be better understood with reference to the following description and drawings. It is to be understood, however, that the description and drawings are for the purpose of illustration only and are not intended to be a definition as to the scope of the invention.

DRAWINGS OF THE INVENTION

In the Drawings:

FIG. 1 is a perspective view of the planting device showing the cavity sections tapering at the bottom, the bottom platform and the ends containing tab sections.

FIG. 2 is a partial cross sectional view taken along lines 2—2 of FIG. 1 showing the interlocking means holding the sidepieces together and also showing the tapering of the cavity to the bottom open end.

FIG. 3 is a vertical sectional view of the device shown in FIG. 1 taken along lines 3—3, further illustrating the corrugations and the cavities, the tapering relationship at the bottom of the cavities and the freestanding platform.

FIG. 4 is a variation of FIG. 3 showing a groove into which the cavity bottom opens.

DETAILED DESCRIPTION

Referring now to the Drawings:

There is shown in the figures various views of a planting device 10 consisting of sidepieces 11 and 12. The sidepieces are of equal dimensions and fit together by interlocking means 17 and 18 to form multiple cavities 13. The depth of the cavities and the number of cavities in each planter 10 is dependent upon the use to which the planter is to be put. Each cavity 13 is of equal depth and terminates in a tapered bottom 13a. Each cavity contains an open top 14 and an open bottom 15 which is substantially smaller in size than open top 14. The cavities can be of any desired shape and may be square, oval or, as illustrated in the drawings, slightly hexagonal. As illustrated in FIG. 2 the outer walls as of each cavity parallel to the longitudinal axis of the device are preferably of greater dimensions than the side walls 26 which angle toward the interlocking means 17 and 18. Such a configuration makes it easier to pull the two sidepieces 11 and 12 apart without disturbing the planting media and seedling contained in the cavity.

As illustrated in FIGS. 1–4 each cavity contains an open top 14 and terminates in an open bottom 15 and has around the periphery thereof corrugations 16. The corrugations tend to channel the root growth downwardly instead of in a spiraling movement thereby promoting the root growth and preventing root tangling, choking and the like.

As illustrated in FIGS. 1 and 2, the interlocking means comprises vertical, elongated grooves 17 and ribs 18 of similar dimensions which frictionally fit or snap into each other thereby creating a positive lock which prevents the sidepieces 11 and 12 from coming apart due to the pressure exerted by the soil or other media placed within the cavity. The ribs 17 and grooves 18 are of substantially the same length as the depth of the cavities and, as illustrated in FIG. 2, alternate on each side of the cavity from a rib 17 to a groove 18. This is not necessary however, and if desired, the ribs 17 could be on one sidepiece and the grooves 18 on the opposite sidepiece. However, in a preferred embodiment of the invention the planting device will consist of an odd number of cavities having alternating interlocking means. This makes the formation of the sidepieces more economical in that only one die need be used in stamping out the thermoformed plastic sidepieces. When an odd number of cavities are involved, the sidepieces can be identical and stored or stacked upon each other until ready for assembly. They may then be assembled by placing them together in a facing relationship, and the ribs and grooves will intermesh and frictionally lock together, thereby forming a completed planting device.

As illustrated in FIG. 1 and 3, the lower portion of each sidepiece 19 extends outwardly and downwardly at an angle to form a base, thereby rendering the planting device freestanding and keeping the bottom of the cavity 15 above the base or platform 19, thereby allowing for "air pruning" of any roots that emerge through bottom opening 15.

An alternate design is illustrated in FIG. 4 wherein platform 19 contains a downward extension 20 on a line even with the periphery of the outside edges of the bottom opening 15 and then extends outwardly and downwardly at an angle, thereby forming a groove 21 at the bottom opening 15 providing more space for airflow at the bottom of each cavity.

One particular advantage of the interlocking means 17 and 18 is that the ribs 17 and grooves 18 do not form a part of the cavity walls, therefore, rendering it substantially impossible for root crossover from one cavity to another.

As illustrated in FIGS. 1 and 2, adjacent to the outside interlocking means, is a backwardly extending endwall 22 which terminates in a plane even with the sides 25 of cavities 13 and is contiguous with platform 19 thereby forming a continuous rim or flange around the sides and bottom of each sidepiece. This strengthens the structure of each sidepiece but also allows for support to the freestanding device. As an extension of and part of the backwardly extending endwalls 22, is a tab section 23 which is substantially at right angles with endwalls 22 and is in a plane even with the outside edges of endwalls 22, platform 19 and cavity wall 25. This tab portion extends only from the upper section of the sidepiece as illustrated in FIG. 1 and forms a means whereby the planting device 10 may be suspended on supports such as the sides of a container, parallel rods or the like, thereby allowing the planter to be slid along said supports and be nested close to each other. An additional advantage is also that the bottom of the planter is suspended so that the root structure will be "air pruned" as it emerges from hole 15. It has been found with prior art devices that when the bottom hole of a cavity rests directly on a supporting structure that the roots will not be "air pruned" but will migrate along the surface upon which the planting device rests.

Also forming part of the planter and extending outwardly from the interlocking means 17 and 18 and connecting cavity walls 26, is a top portion 24 as illustrated in FIG. 1; this portion also serves to strengthen the structure and to reenforce sidewalls 26.

When using the device the cavities can be filled to the desired depth with the planting material and the seed then planted and covered with mulch, the planters can be stacked together in containers, racks, or other appropriate devices, or left freestanding, and water and nutrients can be added as desired. As the seedling emerges the sidepieces 11 and 12 can be separated to check on root development and growth without disturbing the planting media and then put back together. When the seedling is ready for planting, the planters can be physically transported to the planting location and the sidepieces 11 and 12 can then be separated. The planting material in each cavity will retain the form of the cavity. Such material containing the sprouted seedling can be slid out of the sidepiece in which it remains and transplanted directly into the soil prepared to receive such transplant.

Although the invention as has been described is deemed to be that which would form the preferred embodiment of the invention, it is recognized that departures may be made therefrom without departing from the scope of the invention which is not limited to details disclosed, but is to be accorded the full scope of the claims so as to include any and all equivalent devices.

We claim:

1. A freestanding multiple cavity planting device capable of reuse comprising,
    a. two separate sidepieces of equal dimensions frictionally held together by interlocking means on both sides of each cavity, said interlocking means extending substantially the length of each cavity,
    b. each cavity having an open top, vertical corrugations running from top to bottom around the perimeter thereof and tapering in at the lower portion, terminating in an open bottom which is substantially smaller than the open top,
    c. the extreme lower portion of each sidepiece extending outwardly and downwardly from the open bottom of each cavity thereby forming a freestanding platform base wherein the open bottom of the cavity is above said base.

2. A planting device as claimed in claim 1 wherein the extreme lower portion of each sidepiece extends downwardly along a longitudinal line even with the outer periphery of the open bottom of each cavity and then extends outwardly and downwardly thereby forming a freestanding platform base having a horizontal longitudinal groove into which each cavity bottom opens.

3. A planting device as claimed in claim 1 wherein the end portion of each sidepiece extends backwardly adjacent the outside interlocking means, said backward extension being contiguous with the outwardly extending platform base to form a continuous rim around the sides and bottom of each sidepiece.

4. A planting device as claimed in claim 3 wherein the upper section of each backwardly extending end portion contains an outwardly extending tab which is substantially at right angles with said backward extension and in a plane even with the outer periphery of each sidepiece.

5. A planting device as claimed in claim 3 wherein the interlocking means comprises vertical ribs in one sidepiece which frictionally fit into vertical grooves of the same dimensions in the opposite sidepiece.

6. A planting device as claimed in claim 5 wherein the interlocking means comprises alternating ribs and grooves in each sidepiece.

7. A planting device as claimed in claim 6 wherein said device contains an odd number of cavities.

* * * * *